US012247426B2

(12) United States Patent
Schmid et al.

(10) Patent No.: US 12,247,426 B2
(45) Date of Patent: Mar. 11, 2025

(54) FURNITURE DRIVE

(71) Applicant: Julius Blum GmbH, Hoechst (AT)

(72) Inventors: Malte Schmid, Bodolz (DE); Maximilian Keck, Hard (AT)

(73) Assignee: Julius Blum GmbH, Hoechst (AT)

( * ) Notice: Subject to any disclaimer, the term of this patent is extended or adjusted under 35 U.S.C. 154(b) by 100 days.

(21) Appl. No.: 18/027,542

(22) PCT Filed: Oct. 15, 2021

(86) PCT No.: PCT/AT2021/060380

§ 371 (c)(1),
(2) Date: Mar. 21, 2023

(87) PCT Pub. No.: WO2022/082237

PCT Pub. Date: Apr. 28, 2022

(65) Prior Publication Data

US 2023/0340818 A1 Oct. 26, 2023

(30) Foreign Application Priority Data

Oct. 22, 2020 (AT) .............................. A 50912/2020

(51) Int. Cl.
*E05F 1/08* (2006.01)
*E05D 3/06* (2006.01)
*E05D 13/00* (2006.01)

(52) U.S. Cl.
CPC ............... *E05D 3/06* (2013.01); *E05D 13/12* (2013.01); *E05Y 2201/604* (2013.01)

(58) Field of Classification Search
CPC ........ E05D 3/06; E05D 3/12; E05Y 2201/604
See application file for complete search history.

(56) References Cited

U.S. PATENT DOCUMENTS 7,794,028 B2 9/2010 Brunnmayr
8,567,884 B2 10/2013 Isele et al.
(Continued)

FOREIGN PATENT DOCUMENTS

AT 502937 A1 * 6/2007 ............. E05D 11/00
AT 508 959 5/2011
(Continued)

OTHER PUBLICATIONS

International Search Report issued Jan. 19, 2022 in International (PCT) Application No. PCT/AT2021/060380.

*Primary Examiner* — Chuck Y Mah

(74) *Attorney, Agent, or Firm* — Wenderoth, Lind & Ponack, L.L.P.

(57) ABSTRACT

A furniture drive includes a carrier to be fixed a furniture carcass, an actuating arm for moving the movably-supported furniture part relative to the carrier, the actuating arm being pivotable about a first pivoting axis, and an interface for fixing a synchronization shaft, and configured to synchronize a pivotal movement of the actuating arm with a pivotal movement of an actuating arm of a further actuating drive. The interface includes a component pivotable about a second pivoting axis, the second pivoting axis being arranged laterally offset to the first pivoting axis of the actuating arm. The carrier has an upper side which, in a mounted condition of the furniture drive on the furniture carcass, faces towards a top panel of the furniture carcass, and the first pivoting axis has a larger perpendicular distance to the upper side than the second pivoting axis.

27 Claims, 6 Drawing Sheets

(56) References Cited

U.S. PATENT DOCUMENTS

| | | | | |
|---|---|---|---|---|
| 9,085,925 | B2 | 7/2015 | Steinhauser | |
| 9,181,743 | B2 | 11/2015 | Kashiwaguma | |
| 9,719,283 | B2 * | 8/2017 | Holzapfel | A47B 96/00 |
| 10,246,915 | B2 | 4/2019 | Brunnmayr | |
| 10,407,962 | B2 * | 9/2019 | Schluge | F16H 21/44 |
| 10,487,554 | B2 | 11/2019 | Lubetz et al. | |
| 10,494,846 | B2 * | 12/2019 | Schmid | E05D 3/16 |
| 10,662,690 | B2 * | 5/2020 | Schluge | E05F 1/1253 |
| 11,248,406 | B2 * | 2/2022 | Nordieker | E05F 1/1058 |
| 2008/0054771 | A1 | 3/2008 | Brunnmayr | |
| 2008/0172833 | A1 * | 7/2008 | Migli | E05F 1/1091 16/277 |
| 2012/0181909 | A1 | 7/2012 | Isele et al. | |
| 2013/0026114 | A1 | 1/2013 | Kashiwaguma | |
| 2014/0191632 | A1 | 7/2014 | Steinhauser | |
| 2014/0317883 | A1 * | 10/2014 | Baldreich | E05F 1/1261 16/280 |
| 2016/0034004 | A1 * | 2/2016 | Park | E05D 11/1078 16/366 |
| 2017/0204645 | A1 * | 7/2017 | Lubetz | F16H 25/18 |
| 2017/0247923 | A1 * | 8/2017 | Hirtsiefer | E05D 3/16 |
| 2017/0292307 | A1 * | 10/2017 | Hirtsiefer | E05F 1/1276 |
| 2017/0328103 | A1 | 11/2017 | Brunnmayr | |
| 2019/0093404 | A1 * | 3/2019 | Schmid | E05F 1/1058 |
| 2019/0352952 | A1 * | 11/2019 | Schmid | E05F 1/1041 |
| 2020/0131830 | A1 * | 4/2020 | Byun | E05D 11/0054 |
| 2022/0120123 | A1 * | 4/2022 | Schmid | E05D 3/06 |
| 2022/0251890 | A1 * | 8/2022 | Hirtsiefer | E05D 7/125 |
| 2022/0259905 | A1 * | 8/2022 | Hirtsiefer | E05F 1/1058 |
| 2022/0259909 | A1 * | 8/2022 | Hirtsiefer | E05D 11/0009 |
| 2022/0307309 | A1 * | 9/2022 | Hirtsiefer | E05F 1/105 |
| 2023/0018847 | A1 * | 1/2023 | Keck | E05F 5/02 |

FOREIGN PATENT DOCUMENTS

| | | | | |
|---|---|---|---|---|
| AT | 508959 A1 | * | 5/2011 | E05D 15/46 |
| AT | 511 335 | | 11/2012 | |
| AT | 516783 | | 8/2016 | |
| CN | 106639718 | | 5/2017 | |
| CN | 106639718 A | * | 5/2017 | |
| DE | 11 2009 000 548 | | 3/2017 | |
| EP | 2 551 433 | | 1/2013 | |
| JP | 2008-538938 | | 11/2008 | |
| JP | 2013-508576 | | 3/2013 | |
| JP | 2017-536492 | | 12/2017 | |
| JP | 2018-508672 | | 3/2018 | |
| WO | 2006/113953 | | 11/2006 | |
| WO | WO-2006113953 A1 | * | 11/2006 | E05D 11/00 |
| WO | WO-2011047396 A1 | * | 4/2011 | E05D 15/46 |

* cited by examiner

FURNITURE DRIVE

BACKGROUND OF THE INVENTION

The present invention relates to a furniture drive for moving a movably-supported furniture part, the furniture drive comprising:

a carrier configured to be fixed to a furniture carcass, at least one actuating arm for moving the movably-supported furniture part relative to the carrier, the at least one actuating arm being pivotable about at least one first pivoting axis, an interface for fixing a synchronization shaft, the synchronization shaft being configured to synchronize a pivotal movement of the at least one actuating arm with a pivotal movement of at least one actuating arm of at least one further actuating drive, wherein the interface includes at least one component pivotable about a second pivoting axis, the second pivoting axis being arranged laterally offset to the first pivoting axis of the actuating arm.

Moreover, the invention relates to an arrangement comprising two furniture drives of the type to be described, the first furniture drive being configured to be fixed to a first sidewall of the furniture carcass and the second furniture drive being configured to be fixed to a second sidewall of the furniture carcass, the second sidewall opposing the first sidewall, and a pivotal movement of the at least one actuating arm of the first furniture drive can be synchronized with a movement of the at least one actuating arm of the second furniture drive by the synchronization shaft.

WO 2006/113953 A1 discloses an item of furniture with a furniture carcass, and two furniture drives are fixed to opposing sidewalls of the furniture carcass. Each of the furniture drives includes a rotatable member configured to be connected in a movement-coupled manner to an actuating arm for moving a furniture flap. By a synchronization rod, a pivotal movement of the rotatable members of the furniture drives can be synchronized with one another. As a result, the furniture flap can be uniformly elevated and lowered by the two furniture drives, without being tilted thereby. The synchronization rod can also be connected to the rotatable members when the two furniture drives have already been pre-mounted to the furniture carcass. A drawback of this construction is the fact that the synchronization rod, in a mounted condition, can impede the storing and removal of storage goods into and from the furniture carcass. Moreover, the synchronization rod, in a mounted condition, is located adjacent to a front face of the furniture carcass, which can be visually disturbing.

CN 106639718 A discloses an item of furniture with a furniture flap which can be driven relative to the furniture carcass by two furniture drives arranged on the furniture carcass. Each of the furniture drives includes a pivotable actuating arm for moving the furniture flap. For synchronizing a pivotal movement of the two actuating arms, a synchronization rod is provided. In a mounted condition, the synchronization rod is connected on both sides with a pivotable synchronization element of the furniture drives. The pivoting axis of the synchronization rod is arranged laterally offset to the pivoting axes of the actuating arms. A drawback of this construction is the fact that the synchronization rod, in a mounted condition, considerably impedes the storage and removal of storage goods into or from the furniture carcass.

SUMMARY OF THE INVENTION

It is an object of the present invention to propose a furniture drive mentioned in the introductory part, thereby avoiding the above-discussed drawbacks.

According to the invention, the carrier has at least one upper side which, in a mounted condition of the furniture drive on the furniture carcass, is facing towards a top panel of the furniture carcass, and the first pivoting axis has a larger perpendicular distance to the at least one upper side than the second pivoting axis.

In other words, the first pivoting axis of the actuating arm and the second pivoting axis of the pivotable component configured to be connected to the synchronization shaft are arranged offset relative to one another.

In this way, several constructive advantages can be provided. For example, the pivotable component, in a mounted condition of the furniture drive on the furniture carcass, can be arranged on a position as high as possible within the furniture carcass. As a result, the synchronization shaft coupled to the pivotable component does hardly impede the storage and removal of storage items.

Thereby, the carrier includes at least one front face through which the at least one actuating arm at least partially projects in at least one relative position corresponding to an open position of the movable furniture part, and the first pivoting axis has a smaller perpendicular distance to the at least one front face than the second pivoting axis.

Moreover, the pivotable component, in a mounted condition of the furniture drive on the furniture carcass, is arranged on a position as deep as possible in a direction extending in the depth of the furniture carcass, and the synchronization shaft coupled to the pivotable component—also due to a shadowing caused by the furniture carcass—barely appears from a visual point of view.

According to an embodiment, at least one coupling device is provided, the at least one coupling device being configured to couple a pivoting movement of the at least one actuating arm to a pivoting movement of the at least one pivotable component of the interface. The coupling device can include, for example, co-operating tooth arrangements and/or at least one cable pulley.

The at least one coupling device can include at least one tooth arrangement, and the at least one tooth arrangement includes at least one tooth segment.

BRIEF DESCRIPTION OF THE DRAWINGS

Further details and advantages of the present invention result from the following description of figures.

DETAILED DESCRIPTION OF THE INVENTION

Figure 1A:
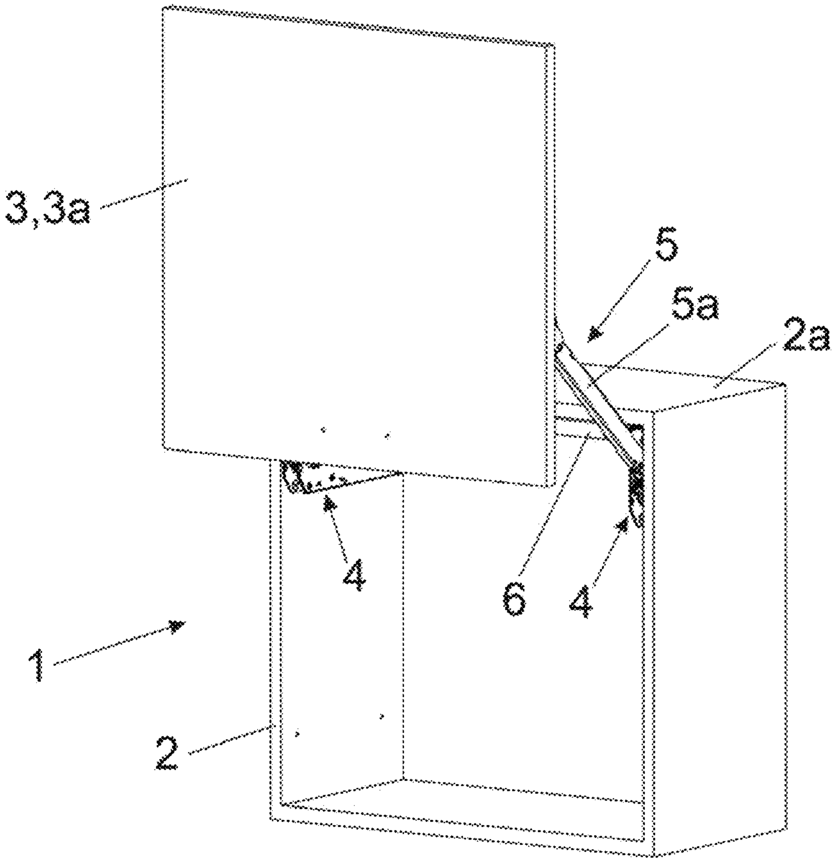
FIG. 1*a*, 1*b* show an item of furniture comprising a movable furniture part and two furniture drives for moving the furniture part, and the item of furniture with the furniture part removed.

FIG. 1*a* shows an item of furniture 1 comprising a furniture carcass 2 and a movable furniture part 3 in the form of a furniture flap 3*a* which can be elevated relative to the furniture carcass 2. On each of the opposing sidewalls of the furniture carcass 2, a furniture drive 4 is fixed for moving the movable furniture part 3. Each of the furniture drives 4 includes a pivotally supported actuating arm 5, and a pivotal movement of the two actuating arms 5 of the furniture drives 4 can be synchronized with one another via a synchronization shaft 6.

Figure 1B:
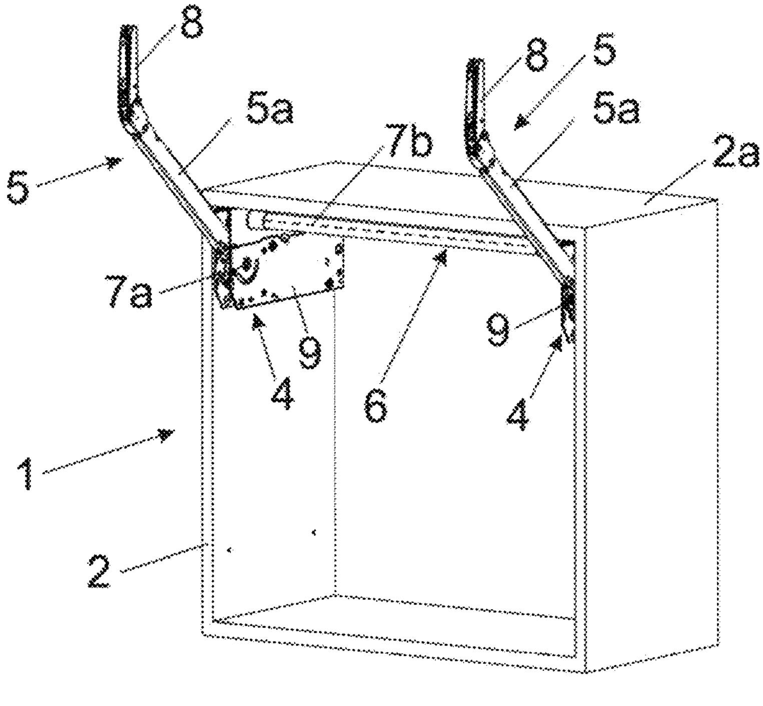

FIG. 1*b* shows the item of furniture 1 according to FIG. 1*a* with the furniture part 3 removed. The two furniture drives 4 can be configured to be identical in construction. Therefore, the explanations provided here are valid for both furniture drives 4.

The furniture drive 4 includes a, preferably substantially cuboidal, carrier 9 configured to be fixed to the furniture carcass 2. At least one lever 5*a* of the actuating arm 5 is pivotally supported about a first pivoting axis 7*a* on the carrier 9. In contrast, the synchronization shaft 6 is rotatably supported about a second pivoting axis 7*b*, and the first pivoting axis 7*a* of the lever 5*a* and the second pivoting axis 7*b* of the synchronization shaft 6 are arranged laterally offset to one another, preferably mutually spaced from each other in a parallel relationship.

The offset arrangement between the first pivoting axis 7*a* of the lever 5*a* of the actuating arm 5 and the second pivoting axis 7*b* of the synchronization shaft 6 has the particular advantage that the synchronization shaft 6 can be arranged, for example, on a high location within the furniture carcass 2, that is to say close to a top panel 2*a* of the furniture carcass 2.

Further, it can be provided that the second pivoting axis 7*b*, in a mounted condition of the furniture drive 4, can be arranged deeper in a direction extending in the depth of the furniture carcass 2, compared with a known coaxial arrangement between the first pivoting axis 7*a* and the second pivoting axis 7*b*.

The lever 5*a* of the actuating arm 5 includes a fitting portion 8 configured to be releasably connected to a fitting body (not shown) to be arranged on the furniture part 3. The fitting portion 8 can be hingedly connected to the lever 5*a* of the actuating arm 5, and can be configured such that the fitting portion 8 is connectable to the fitting body to be fixed to the furniture part 3 without the use of a tool.

Figure 2A:
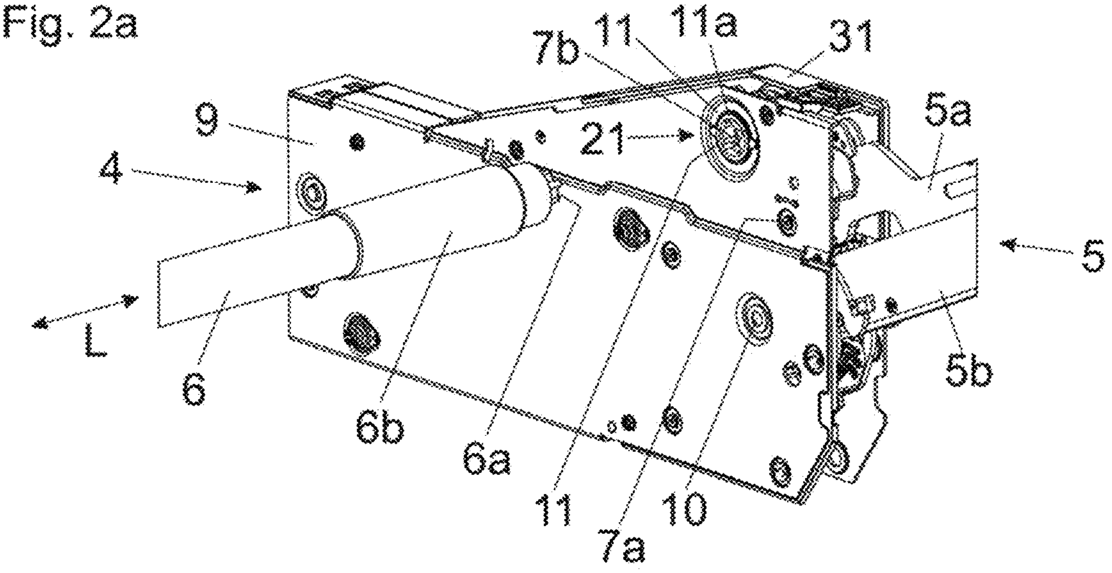
FIG. 2*a*-2*c* show the mounting operation of the synchronization shaft to the pivotable component of the furniture drive.
Figure 2B:
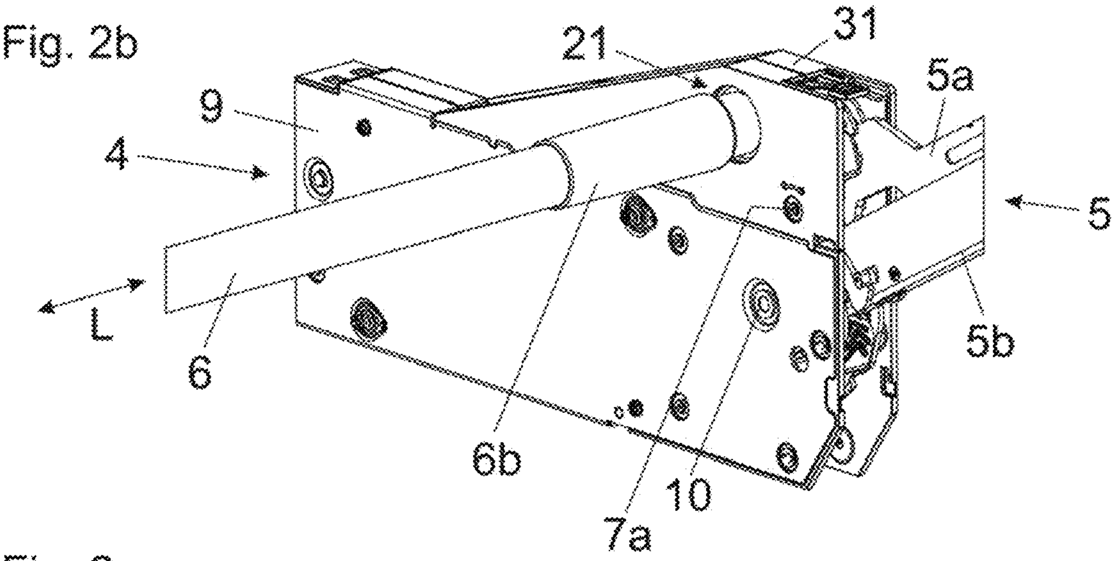
Figure 2C:
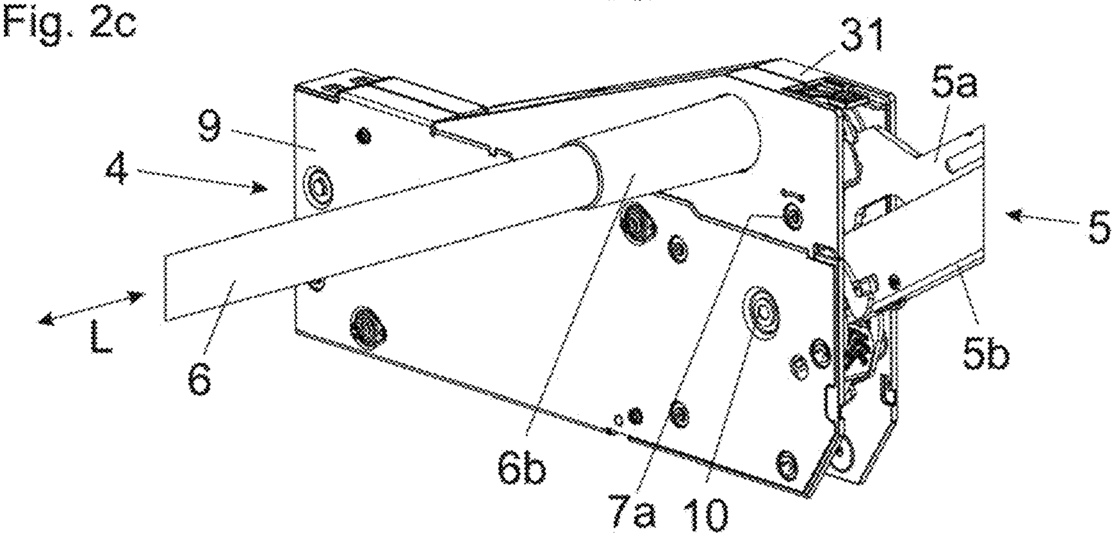

FIG. 2*a*-2*c* show the mounting operation of the synchronization shaft 6 on the furniture drive 4. The actuating arm 5 can include a plurality of levers 5*a*, 5*b* hingedly connected to one another, preferably wherein

- at least two of the provided levers 5*a*, 5*b* of the actuating arm 5, in at least one pivoting position, preferably in each pivoting position, of the actuating arm 5 are nested relative to one another, so that the two levers 5*a*, 5*b* are arranged substantially in a gap-free manner relative to one another in a view from the side, and/or
- at least one lever 5*b* is configured to be U-shaped in a cross-section, and a further lever 5*a* is at least partially arranged or can be arranged between the vertical limbs of the U-form, and/or
- the actuating arm 5 is configured to be symmetrical relative to a notional middle plane, and/or
- at least one, preferably at least two, of the levers 5*a*, 5*b* of the actuating arm 5 can be releasably connected to the carrier 9 of the furniture drive 4.

In the shown embodiment, the first lever 5*a* is pivotally supported about a first pivoting axis 7*a* and the other lever 5*b* is pivotally supported about a further pivoting axis 10.

The carrier 9 has at least one upper side 31 which, in a mounted condition of the furniture drive 4 on the furniture carcass 2, faces towards the top panel 2*a* of the furniture carcass 2, and the first pivoting axis 7*a* has a larger perpendicular distance to the at least one upper side 31 than the second pivoting axis 7*b* (FIG. 1*b*).

The furniture drive 4 includes an interface 21 for fixing the synchronization shaft 6 by which a pivotal movement of the at least one actuating arm 5 can be synchronized with a pivotal movement of the at least one actuating arm 5 of at least one further furniture drive 4.

The interface 21 includes a component 11 pivotally supported about the second pivoting axis 7*b*, the component 11 being configured to be releasably connected to the synchronization shaft 6. It can be seen that the first pivoting axis 7*a* of the lever 5*a* and the second pivoting axis 7*b* of the component 11 are mutually spaced from one another in a parallel relationship.

The component 11 pivotable about the second pivoting axis 7*b* includes a receiving device 11*a* for receiving the synchronization shaft 6. Preferably, it can be provided that the receiving device 11*a* includes a non-circular cross-section for receiving the synchronization shaft 6. It can be particularly preferred that the synchronization shaft 6 can be connected to the receiving device 11*a* only in one single pivoting position within a pivoting angle range of 360°.

The synchronization shaft 6 includes a shaft journal 6*a*, and an outer contour of the shaft journal 6*a* substantially corresponds to an inner contour of the receiving device 11*a*. In this way, a form-locking connection for transmitting a torque between the pivotable component 11*a* and the synchronization shaft 6*a* can be established.

Starting from FIG. 2*a*, the shaft journal 6*a* of the synchronization shaft 6 is to be introduced into the receiving device 11*a* of the pivotable component 11 (FIG. 2*b*). Subsequently, a cover 6*b* configured to be moved in a direction of the longitudinal axis (L) is pushed into the receiving device 11*a* so as to cover the shaft journal 6*a* (FIG. 2*c*).

The first furniture drive 4 is to be fixed to a first sidewall of the furniture carcass 2 and the second furniture drive 4 is to be fixed to a second sidewall of the furniture carcass 2, the second sidewall opposing the first sidewall.

In a mounted condition, the synchronization shaft 6 is connected in a torque-proof manner to the two pivotably-supported components 11 of the furniture drives 4, and a pivotal movement of the at least one actuating arm 5 of the first furniture drive 4 can be synchronized with a pivotal movement of at least one actuating arm 5 of the second furniture drive 4 by virtue of the synchronization shaft 6.

Figure 3A:
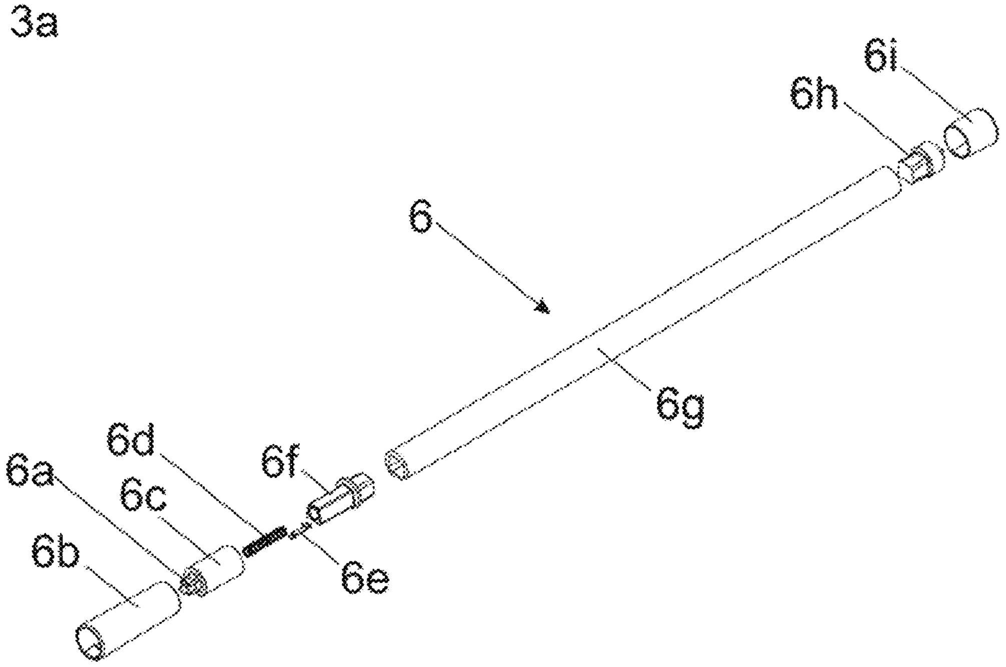
FIG. 3*a*, 3*b* show the synchronization shaft in an exploded view and in an assembled condition.

FIG. 3*a* shows the synchronization shaft 6 in an exploded view. The synchronization shaft 6 includes a central shaft journal 6*g* which can have a non-rotationally symmetrical cross-section.

A connecting portion 6*f* can be connected to a first end portion of the central shaft journal 6*g*, and the connecting portion 6*f* is configured to receive a spring element 6*d*. The shaft journal 6*a* is arranged on a portion 6*c* configured to be pressurized by the spring element 6*d*. The shaft journal 6*a*, in a mounted condition of the synchronization shaft 6, is pressed against the pivotable component 11 by the spring element 6*d*.

By a limiting element 6*e*, it can be prevented that the portion 6*c* can be detached from the connecting portion 6*f*. By a, preferably sleeve-shaped, cover 6*b*, at least the shaft journal 6*a* can be covered.

On the second end of the synchronization shaft 6, it can be preferably provided that there is no spring element 6*d* present. Here, a form-locking connection is provided on a connecting portion 6*h*, the form-locking connection being provided to connect the synchronization shaft 6 to the pivotable component 11 of the opposing furniture drive 4 in a form-locking manner, and a displaceable cover 6*i* is also provided.

Figure 3B:
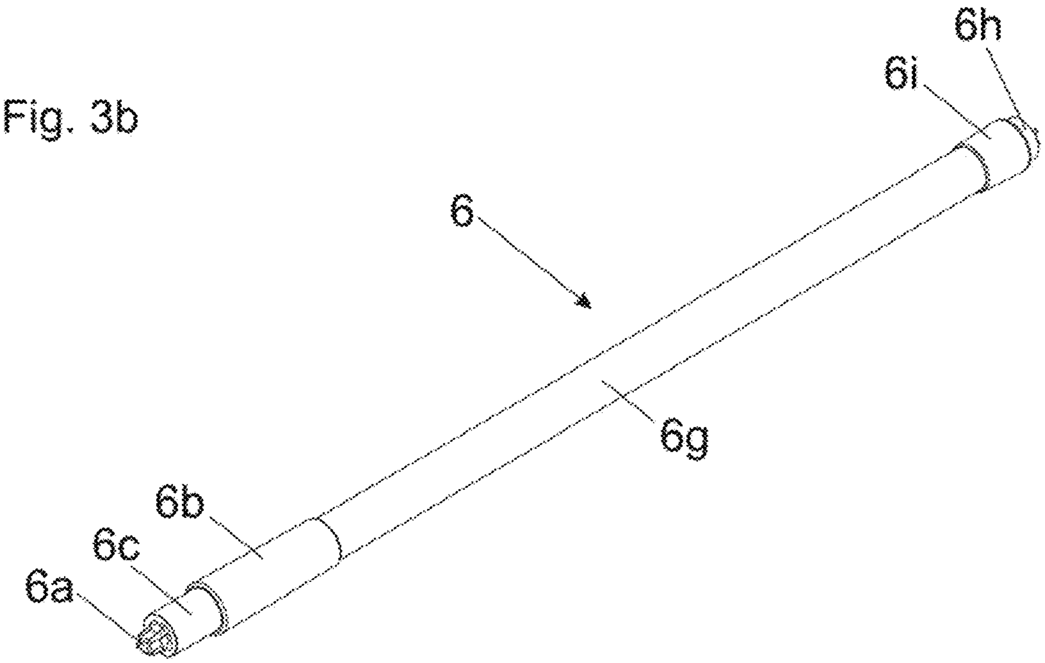

FIG. 3*b* shows the synchronization shaft 6 in an assembled condition.

Figure 4A:
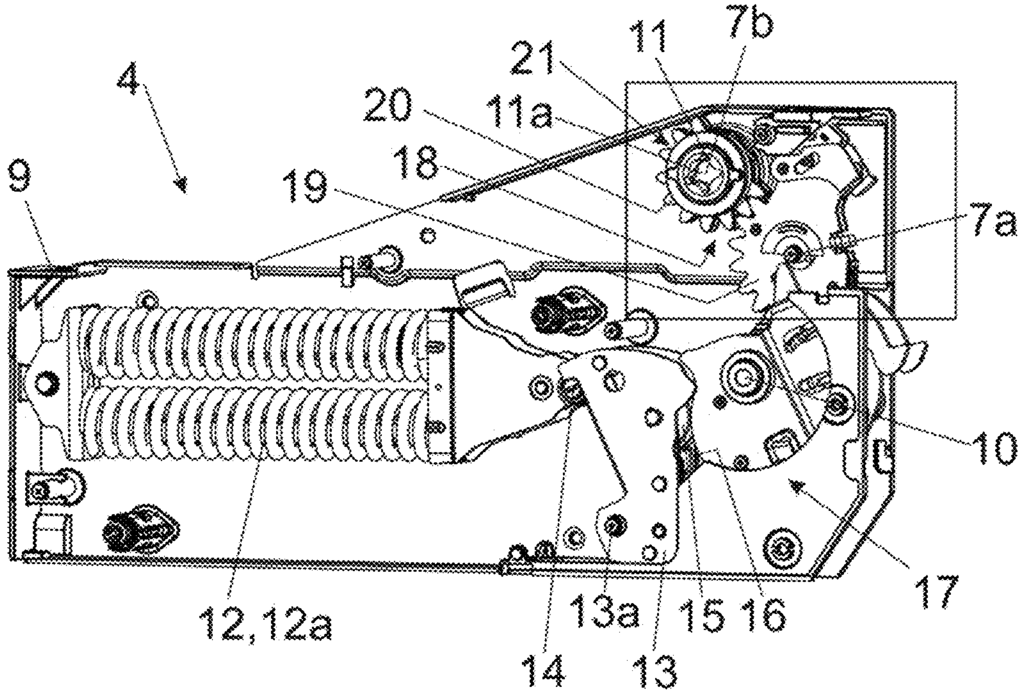
FIG. 4*a*, 4*b* show the furniture drive in a side view and an enlarged detail view thereof.

FIG. 4*a* shows the furniture drive 4 in a side view. The furniture drive 4 includes at least one force storage member 12, the force storage member 12 being preferably supported on the carrier 9. The force storage member 12 preferably includes a spring element 12*a* for applying a force to the actuating arm 5 (not shown here) so as to compensate for a weight of the furniture part 3 to be connected to the actuating arm 5.

By a transmission mechanism 17, a force which can be stored in the force storage member 12 can be transmitted to the actuating arm 5, preferably wherein the transmission mechanism 17

- includes at least one intermediate lever 13 pivotable about a pivoting axis 13*a*, preferably wherein the at least one force storage member 12 is connected to the at least one intermediate lever 13 via an, preferably adjustable, engagement location 14, and/or
- includes at least one pressure portion 15, preferably a rotatable pressure roller, and at least one setting contour 16 on which the at least one pressure portion 15 can be displaceably supported upon a movement of the actuating arm 5, preferably wherein the at least one pressure portion 15 is arranged on the at least one intermediate lever 13 of the transmission mechanism 17 and the at least one setting contour 16 is arranged or can be arranged on the actuating arm 5, or vice versa.

The interface 21 includes the component 11 rotatable about the pivoting axis 7*b*, the rotatable component 11 being provided with a receiving device 11*a* configured to releasably receive the synchronization shaft 6.

The furniture drive 4 includes at least one coupling device 18 configured to couple a pivoting movement of the at least one actuating arm 5 with a pivoting movement of the at least one component 11 of the interface 21. It can be seen that the pivoting axis 7*a* of the actuating arm 5 and the pivoting axis 7*b* of the pivotable component 11 are arranged offset relative to one another.

According to an embodiment, it can be provided that the at least one coupling device 18 includes an eccentric transmission.

The coupling device 18 can include at least one tooth arrangement 19, 20. Preferably, the at least one tooth arrangement 19, 20 includes at least one tooth segment 19*a*, 20*a* (FIG. 5*a*, FIG. 5*b*).

Figure 4B:
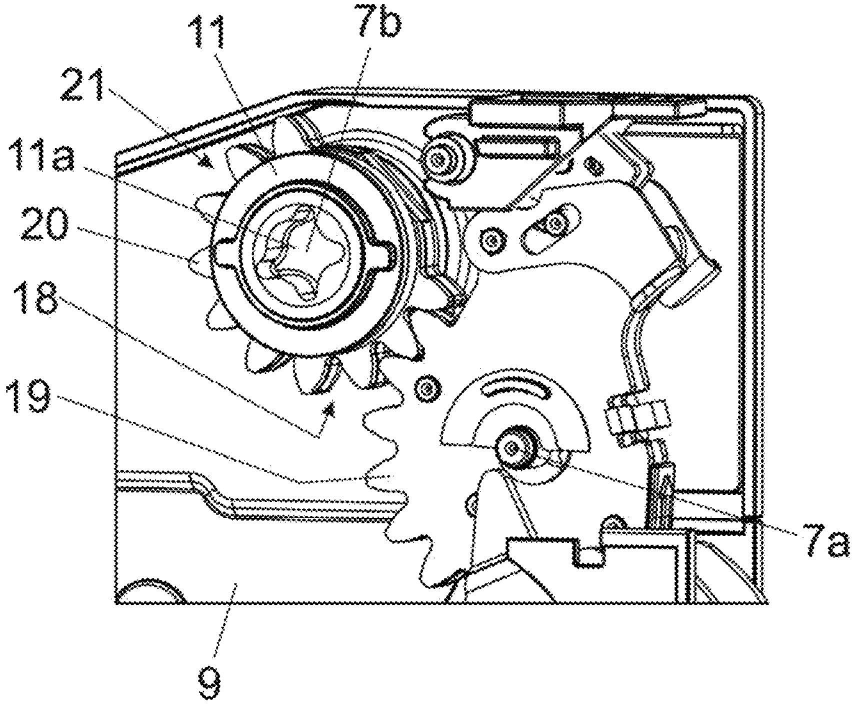

FIG. 4*b* shows the framed region of FIG. 4*a* in an enlarged view, in which the coupling device 18 for the coupling between the actuating arm 5 and the pivotable component 11 emerges in greater detail.

Figure 5A:
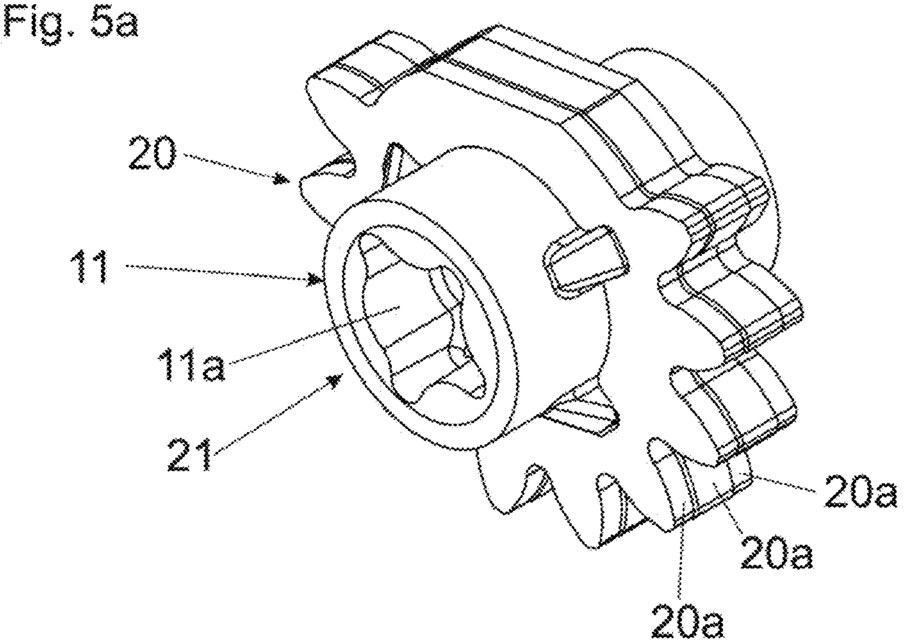
FIG. 5*a*, 5*b* show the pivotable component of the interface in a perspective view and the co-operating tooth arrangements in an exploded view.
Figure 5B:
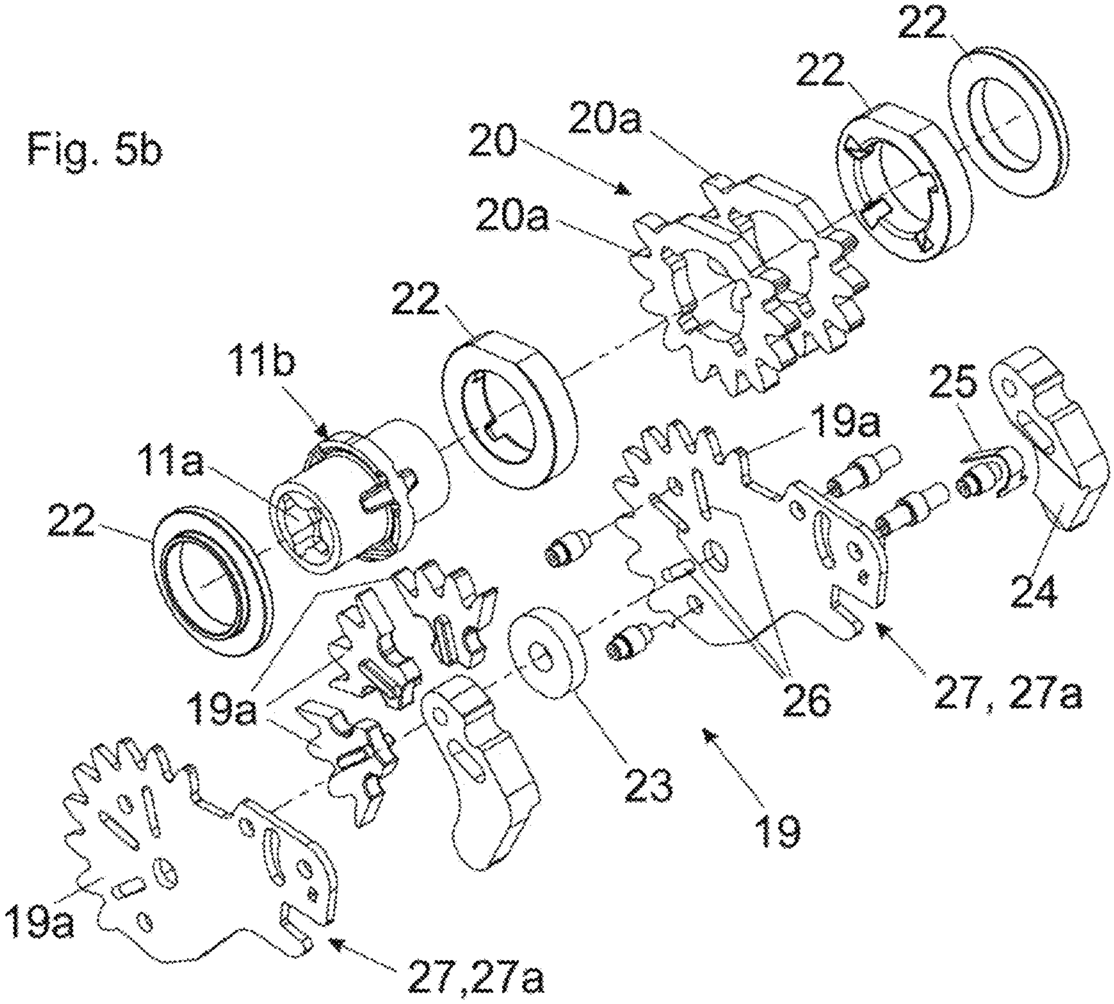

FIG. 5*a* shows the interface 21 for releasably coupling the synchronization shaft 6.

According to an embodiment, it can be provided that the at least one tooth arrangement 19, 20 includes at least two tooth segments 19*a*, 20*a*, wherein

- one of the two tooth segments 19*a* is connected or is configured to be connected to the at least one actuating arm 5, and the other of the two tooth segments 20*a* is connected or is configured to be connected to the interface 21, and/or
- at least two tooth segments 19*a*, 20*a* bear in layers against one another in a direction extending in the first or second pivoting axis 7*a*, 7*b*.

In the shown figure, the at least two tooth segments 19*a*, 20*a* bear in layers against one another in a direction extending in the first or second pivoting axis 7*a*, 7*b*. One of the at least two tooth segments 19*a*, 20*a* consists of a first material and the other of the tooth segments 19*a*, 20*a* consists of a second material, the second material having a lower hardness than the first material. Preferably, the first material is steel and/or the second material is plastic.

According to a preferred embodiment of the invention, it can be provided that at least two tooth segments 20*a*, 20*b* bear in layers against one another in a direction extending in the first or second pivoting axis 7*a*, 7*b*. One of the at least two tooth segments 20*a*, 20*b* protrudes over the other of the tooth segments 20*a* in a radial direction relative to the first or second pivoting axis 7*a*, 7*b*.

In FIG. 5*a*, in other words, at least one central tooth segment 20*a*, preferably of elastic plastic, is received between two outer tooth segments 20*a*, preferably of steel. The central tooth segment 20*a* protrudes over the two outer tooth segments 20*a* in a radial direction. In this way, the occurring play between the tooth arrangements 19, 20 of the coupling device 18 can be reduced, and the synchronization between the two pivotable components 11 of the furniture drives 4 can be significantly improved.

FIG. 5*b* shows an exploded view of the tooth arrangements 19, 20 co-operating with one another.

The tooth arrangement 20 is arranged on the pivoting axis 7*b* of the pivotable component 11, the tooth arrangement 20 including a plurality of tooth segments 20*a* bearing against one another. The tooth segments 20*a* are substantially disc-shaped and are arranged on the pivoting axis 7*b* of the pivotable component 11 via spacer members 22.

The other tooth arrangement 19, on the contrary, is arranged on the first pivoting axis 7*a* of the actuating arm 5.

According to an embodiment, it can be provided that the at least one tooth arrangement 19 includes at least one tooth segment 19*a*. At least one pre-stressing element 23 is provided, and at least one tooth segment 19*a* can be urged in a radial direction relative to the first or second pivoting axis 7*a*, 7*b* by the at least one pre-stressing element 23, preferably wherein

- the at least one pre-stressing element 23 is elastically resilient or is configured as a mechanical spring element, and/or
- the at least one pre-stressing element 23 is configured substantially ring-shaped, and/or
- the at least one pre-stressing element 23 is supported on the first or second pivoting axis 7*a*, 7*b*, and/or
- at least one guide 26 is provided, and the at least one tooth segment 19*a* is movably, preferably linearly displaceably, supported along the guide 26.

In FIG. 5*b*, in other words, at least one central tooth segment 19*a* or a plurality of central tooth segments 19*a* is received between two outer tooth segments 19*a*. The central tooth segments 19*a* are radially urged towards the outside by the pre-stressing element 23 so that the central tooth segments 19*a* slightly project over the two outer tooth segments 19*a* in a radial direction. In this way, the occurring play between the tooth arrangements 19, 20 of the coupling device 18 can be reduced, and the synchronization between the two pivotable components 11 of the two furniture drives 4 can be improved.

At least one of the outer tooth segments 19*a* can have a guide 26 for movably supporting a central tooth segment 19*a*.

For example, it can be provided that the at least one central tooth segment 19*a*, 20*a* projects over the two outer tooth segments 19*a*, 20*a* between 0.01 mm and 0.1 mm, preferably between 0.03 mm and 0.07 mm.

At least one tooth arrangement 19, 20 can include a connection device 27 configured to releasably connect a lever 5*a*, 5*b* of the actuating arm 5. The connection device 27 can include, for example, at least one recess 27*a* for partially receiving a lever 5*a*, 5*b* of the actuating arm 5.

By an unlocking element 24 pre-stressed by a spring 25, a lever 5*a*, 5*b* of the actuating arm 5 can be unlocked from a connected condition with the carrier 9, preferably from a connected condition with a tooth arrangement 19, 20. In this way, the actuating arm 5 can be separated from the carrier 9. Upon an actuation of the unlocking element 24 against a force of the spring 25, the locking between the actuating arm 5 and the tooth arrangement 19, 20 can be released.

Figure 6A:
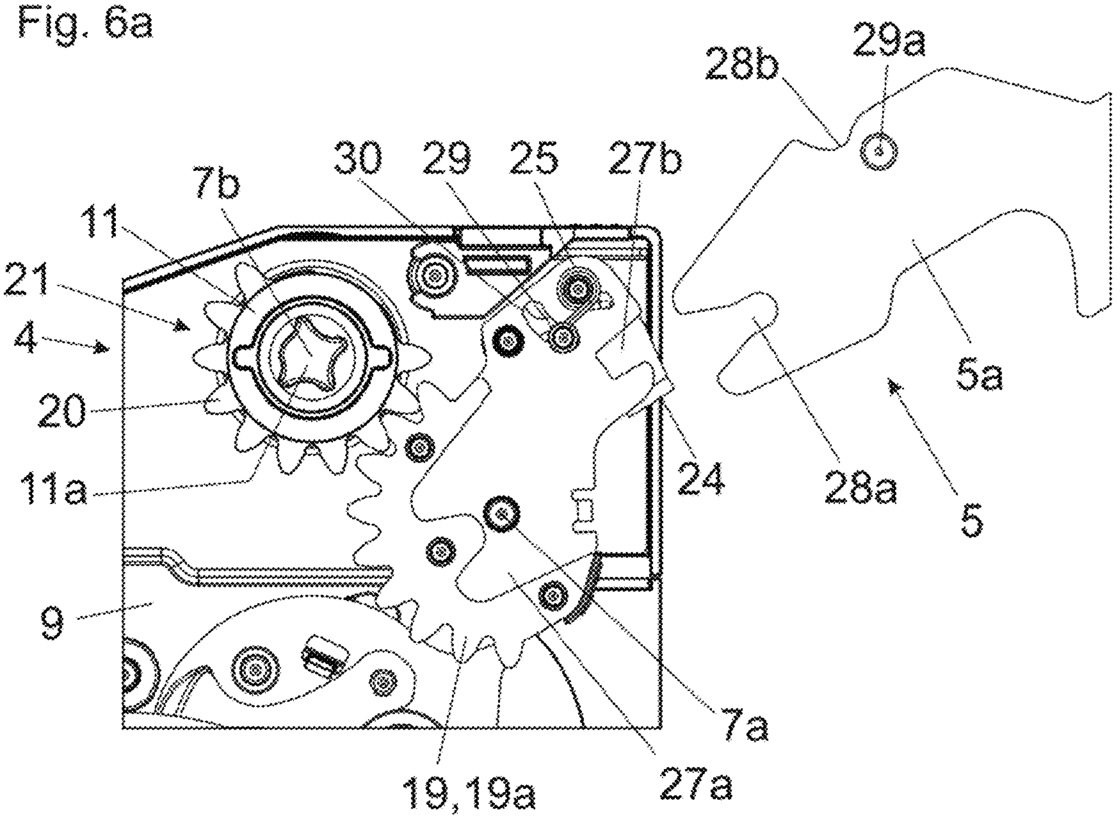
FIG. 6*a*, 6*b* show the actuating arm to be connected to the carrier in a released condition and in a connected condition with the carrier.

FIG. 6*a* shows the lever 5*a* of the actuating arm 5, the lever 5*a* being configured to be connected to the carrier 9. The tooth arrangement 19, preferably the tooth segment 19*a*, includes at least one, preferably funnel-shaped, recess 27*a* for partially receiving the lever 5*a*. It can be seen that a contour of the recess 27*a* is at least partially adapted to a contour of the lever 5*a*. The lever 5*a*, in a connected condition, engages into the recess 27*a* in a form-locking manner.

Figure 6B:
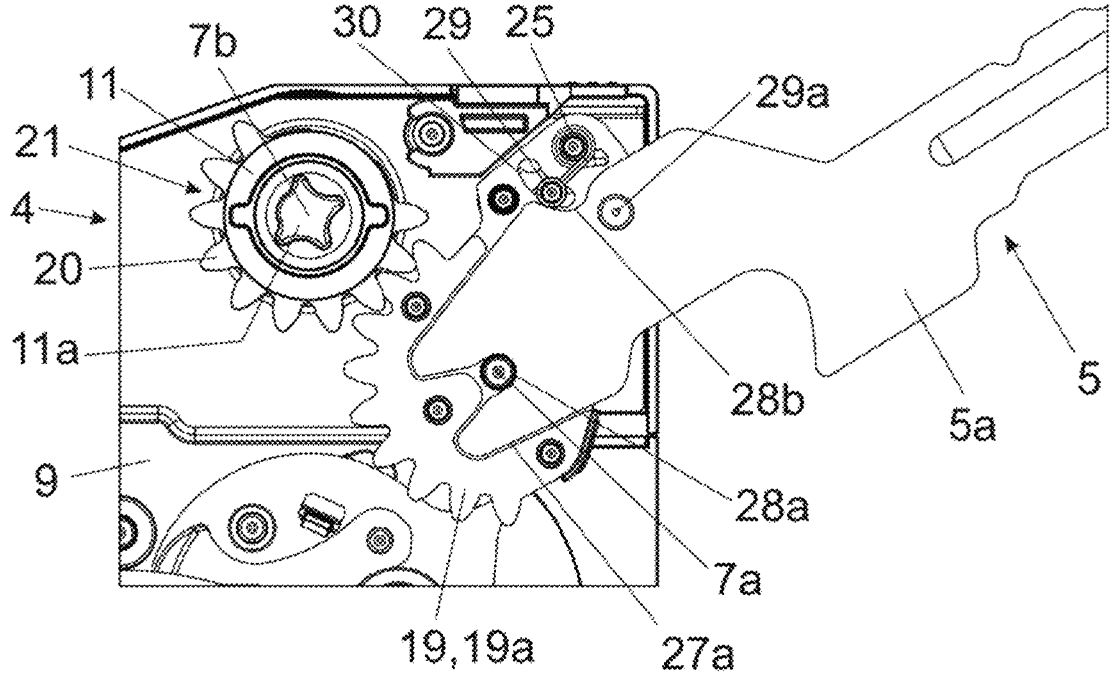

The lever 5*a* is to be hung into a first locking element arranged on the first pivoting axis 7*a* via a first notch 28*a*. Upon inserting the lever 5*a* into the recess 27*a*, a second locking element 29 is moved along a guide track 30 against a force of the spring 25 due to the co-operation with the lever 5*a*. A locking element 29*a*, for example a peg protruding laterally from the lever 5*a*, is arranged on the lever 5*a*. The locking element 29*a*, in a connected condition of the lever 5*a*, engages into a further recess 27*b*. The locking of the lever 5*a* can be established by the locking element 29, and the locking element 29 is configured to lock into the second notch 28*b* of the lever 5*a* by a force of the spring 25 (FIG. 6*b*).

By the three-point locking (that is to say due to the notch 28*a* on the pivoting axis 7*a*, the locking element 29*a* in the recess 27*b*, and the locking element 29 in the notch 28*b*), a particularly tilting-proof connection of the lever 5*a* relative to the carrier 9 can be established.

The recess 27*a* of the tooth arrangement 19 can form an insertion funnel for introducing the lever 5*a* of the actuating arm 5. Therefore, the lever 5*a*, upon mounting, can be centered in a direction of the pivoting axis 7*a*.

For releasing the locking between the lever 5*a* and the carrier 9, the unlocking element 24 is moved against a force of the spring 25, until the second locking element 29 can be unlocked from the second notch 28*b* of the lever 5*a*.

The invention claimed is:

1. A furniture drive for moving a movably-supported furniture part, the furniture drive comprising:

a carrier configured to be fixed a furniture carcass;

an actuating arm for moving the movably-supported furniture part relative to the carrier, the actuating arm being pivotable about a first pivoting axis;

an interface for fixing a synchronization shaft, the synchronization shaft being configured to synchronize a pivotal movement of the actuating arm with a pivotal movement of at least one actuating arm of at least one further actuating drive; and at least one coupling device, wherein the interface includes at least one component pivotable about a second pivoting axis, the second pivoting axis being arranged laterally offset to the first pivoting axis of the actuating arm, wherein the carrier has at least one upper side which, in a mounted condition of the furniture drive on the furniture carcass, is facing towards a top panel of the furniture carcass, and the first pivoting axis has a larger perpendicular distance to the at least one upper side than the second pivoting axis, wherein the at least one coupling device is configured to couple a pivotal movement of the actuating arm to a pivotal movement of the at least one component of the interface, and wherein the at least one coupling device includes an eccentric transmission.

2. The furniture drive according to claim 1, wherein the carrier has at least one front face, and the actuating arm, in at least one relative position corresponding to an open position of the movable furniture part, projects through the at least one front face of the carrier, wherein the first pivoting axis has a smaller perpendicular distance to the at least one front face than the second pivoting axis.

3. The furniture drive according to claim 1, wherein the at least one coupling device includes at least one tooth arrangement.

4. The furniture drive according to claim 3, wherein the at least one tooth arrangement includes at least one tooth segment, the at least one tooth segment having a connection device configured to be releasably connected to a lever of the actuating arm.

5. The furniture drive according to claim 4, wherein the connection device includes at least one recess for partially receiving a lever of the actuating arm.

6. The furniture drive according to claim 3, wherein the at least one tooth arrangement includes two tooth segments, wherein one of the two tooth segments is connected or is configured to be connected to the actuating arm, and the other of the two tooth segments is connected or is configured to be connected to the interface, or the two tooth segments bear in layer against one another in a direction parallel to the first or second pivoting axis.

7. The furniture drive according to claim 6, wherein the two tooth segments bear in layers against one another in the direction parallel to the first or second pivoting axis, wherein one of the two tooth segments consists of a first material and the other of the two tooth segments consists of a second material, the second material having a lower hardness than the first material.

8. The furniture drive according to claim 7, wherein the first material is steel or the second material is plastic.

9. The furniture drive according to claim 6, wherein the two tooth segments are arranged in layers bearing against one another in the direction parallel to the first or second pivoting axis, wherein one of the two tooth segments projects over the other of the two tooth segments in a radial direction relative to the first or second pivoting axis.

10. The furniture drive according to claim 3, wherein the at least one tooth arrangement includes at least one tooth segment, and wherein at least one pre-stressing element is provided for urging the at least one tooth segment in a radial direction relative to the first or second pivoting axis.

11. The furniture drive according to claim 10, wherein the at least one pre-stressing element is elastically resilient or is configured as a mechanical spring element, or the at least one pre-stressing element is substantially ring-shaped, or the at least one pre-stressing element is supported on the first or second pivoting axis, or at least one guide is provided, wherein the at least one tooth segment is movably supported along the at least one guide.

12. The furniture drive according to claim 3, wherein the at least one tooth arrangement includes at least one tooth segment.

13. The furniture drive according to claim 1, wherein the at least one component pivotable about the second pivoting axis includes a receiving device configured to receive the synchronization shaft.

14. The furniture drive according to claim 1, further comprising at least one force storage member configured to pressurize the actuating arm so as to compensate for a weight of the movably-supported furniture part to be fixed to the actuating arm.

15. The furniture drive according to claim 14, further comprising a transmission mechanism for transmitting a force that can be stored in the at least one force storage member to the actuating arm.

16. The furniture drive according to claim 15, wherein the transmission mechanism includes at least one intermediate lever pivotable about a third pivoting axis, or includes at least one pressure portion, and at least one setting contour on which the at least one pressure portion is configured to be displaceably supported upon a movement of the actuating arm.

17. The furniture drive according to claim 16, wherein the transmission mechanism includes the at least one intermediate lever, and the at least one force storage member is connected to the at least one intermediate lever via an engagement location, or includes the at least one pressure portion and the at least one setting contour, wherein the at least one pressure portion includes a rotatable pressure roller.

18. The furniture drive according to claim 16, wherein the transmission mechanism includes the at least one intermediate lever and includes the at least one pressure portion and the at least one setting contour, and wherein the at least one pressure portion is arranged on the at least one intermediate lever and the at least one setting contour is arranged on the actuating arm, or the at least one pressure portion is arranged on the actuating arm and the at least one setting contour is arranged on the at least one intermediate lever.

19. The furniture drive according to claim 14, wherein the at least one force storage member is supported on the carrier and has at least one spring element.

20. The furniture drive according to claim 13, wherein the receiving device includes a non-circular cross-section for receiving the synchronization shaft.

21. The furniture drive according to claim 20, wherein the synchronization shaft is configured to be connected to the receiving device only in one single pivoting position within a pivoting angle range of 360°.

22. The furniture drive according to claim 1, wherein the actuating arm includes a plurality of levers hingedly connected to one another.

23. The furniture drive according to claim 22, wherein at least two levers of the plurality of levers of the actuating arm, in at least one pivoting position of the actuating arm, are nested into one another so that the at least two levers are arranged substantially in a gap-free manner relative to one another in a side view, or at least one lever of the plurality of levers is configured to have a U-form which is U-shaped in a cross-section, and a further lever of the plurality of levers is at least partially arranged or is configured to be arranged between vertical limbs of the U-form, or the actuating arm is configured to be symmetrical relative to a notional middle plane, or at least one lever of the plurality of levers of the actuating arm is configured to be releasably connected to the carrier.

24. The furniture drive according to claim 23, wherein the at least two levers of the plurality of levers of the actuating arm, in each of a plurality of pivoting positions of the actuating arm, are nested into one another so that the at least two levers are arranged substantially in a gap-free manner relative to one another in a side view, or at least two levers of the plurality of levers of the actuating arm are configured to be releasably connected to the carrier.

25. An arrangement comprising:

at least two furniture drives, each of the at least two furniture drives being configured according to the furniture drive of claim 1; and the synchronization shaft, wherein a first one of the at least two furniture drives is to be fixed to a first sidewall of the furniture carcass and a second one of the at least two furniture drives is to be fixed to a second sidewall of the furniture carcass, the second sidewall of the furniture carcass opposing the first sidewall, wherein the synchronization shaft, in a mounted condition, is connected to two respective pivotable portions of the at least two furniture drives in a torque-proof manner, and wherein a pivotal movement of the actuating arm of the first one of the at least two furniture drives can be synchronized with a pivotal movement of the actuating arm of the second one of the at least two furniture drives by the synchronization shaft.

26. The arrangement according to claim 25, wherein the synchronization shaft, on at least one end portion, includes a resilient portion configured to bear against the at least one pivotable component of one of the at least two furniture drives.

27. A furniture drive for moving a movably-supported furniture part, the furniture drive comprising:

a carrier configured to be fixed a furniture carcass;

an actuating arm for moving the movably-supported furniture part relative to the carrier, the actuating arm being pivotable about a first pivoting axis;

an interface for fixing a synchronization shaft, the synchronization shaft being configured to synchronize a pivotal movement of the actuating arm with a pivotal movement of at least one actuating arm of at least one further actuating drive; and at least one coupling device, wherein the interface includes at least one component pivotable about a second pivoting axis, the second pivoting axis being arranged laterally offset to the first pivoting axis of the actuating arm, wherein the carrier has at least one upper side which, in a mounted condition of the furniture drive on the furniture carcass, is facing towards a top panel of the furniture carcass, and the first pivoting axis has a larger perpendicular distance to the at least one upper side than the second pivoting axis, and wherein the at least one coupling device includes at least one tooth arrangement.

* * * * *